(12) United States Patent
Lantto et al.

(10) Patent No.: US 7,152,160 B2
(45) Date of Patent: Dec. 19, 2006

(54) METHOD AND ARRANGEMENT TO SECURE ACCESS TO A COMMUNICATIONS NETWORK

(75) Inventors: Jörgen Lantto, Bromma (SE); Guilhem Ensuque, Biot (FR)

(73) Assignee: Alice Systems AB, Solna (SE)

( * ) Notice: Subject to any disclaimer, the term of this patent is extended or adjusted under 35 U.S.C. 154(b) by 694 days.

(21) Appl. No.: 10/312,333

(22) PCT Filed: Jun. 13, 2001

(86) PCT No.: PCT/SE01/01337

§ 371 (c)(1),
(2), (4) Date: Jul. 14, 2003

(87) PCT Pub. No.: WO02/01822

PCT Pub. Date: Jan. 3, 2002

(65) Prior Publication Data

US 2004/0054794 A1    Mar. 18, 2004

(30) Foreign Application Priority Data

Jun. 29, 2000    (SE)    .................................... 0002446

(51) Int. Cl.
*G06F 9/00*    (2006.01)
(52) U.S. Cl. ...................... 713/168; 713/182; 713/189; 713/193
(58) Field of Classification Search ................ 713/168, 713/182, 189, 193
See application file for complete search history.

(56) References Cited

FOREIGN PATENT DOCUMENTS

| EP | 0 910 015 | 4/1999 |
|---|---|---|
| EP | 1 094 682 | 4/2001 |
| WO | WO 98/32301 | 7/1998 |
| WO | WO 99/37103 | 7/1999 |
| WO | WO 00/55728 | 9/2000 |
| WO | WO 00/76145 | 12/2000 |

*Primary Examiner*—Thomas R. Peeso
(74) *Attorney, Agent, or Firm*—Young & Thompson (57) ABSTRACT

The present invention relates to a method and an arrangement in a data communications system in Internet Protocol (IP) environments. The object of the invention is to achieve a simple way of remote and secure access of a computer to a private data communications network. The solution according to the invention is a Remote Access Login system profiled for accessing the private data communications network via a so-called Pseudo-Connectionless Technology (PCT) device.

34 Claims, 4 Drawing Sheets

METHOD AND ARRANGEMENT TO SECURE ACCESS TO A COMMUNICATIONS NETWORK

FIELD OF INVENTION

The present invention relates to a method and an arrangement in a data communications system in Internet Protocol (IP) environments according to the preamble of the independent claims. More specifically it relates to remote and secure access to a data communications network, such as a corporate Intranet, via a so-called Pseudo-Connectionless Technology (PCT) device such as General Packet Radio Service (GPRS).

DESCRIPTION OF RELATED ART

In the very near future, when commercial GPRS and other similar services are introduced, the mobile workforce of corporations, e.g. business executives, consultants, sales persons, delivery fleets, etc., will be able to access their corporate network while on the move in a cost effective manner, as opposed to previous Global System for Mobile Communications (GSM) circuit-switched data that incurred high per minute charges regardless of whether data was actually transmitted. (A list of acronyms will be found in the end of the description.)

To achieve the remote access several procedures for storage and handling of configuration information and dynamically setting-up communication channels are required More specifically the configuration information and dynamic set-up procedures pertain to three distinct areas:

Data link between a computing device and a mobile data communications device.
  Public communications channels, i.e. data services such as e.g. GPRS, Internet, using the so-called IP protocol suite.
  Secure private communications channels such as Virtual Private Networks (VPN), Authentication services, etc.

Remote Access to Data Networks.

So-called 'dial-up clients' and 'connection managers' enable to automatically configure and manage network connections for computers, e.g. desktop PCs, laptops, Personal Digital Assistants (PDAs), etc. More generally, such software can be embedded inside any consumer or industrial electronic device, e.g. games console, digital camera, vending machine, digital meter etc., that uses an internal or external communication device to access a data network via a different, often public, telecommunications network.

There are mainly two sorts of software used for remote access to data networks:

Software for basic dial-up connectivity, and
  software for dial-up managers.

The first type of software provides the basic components that are required by a computer or integrated communications device to access the Internet using a modem via a public telecommunications network, generally the analogue fixed-wire telephone or a mobile phone service, either analogue or digital. Such software comprises:

Modem control procedures enabling to dial a phone number to the Internet Service Provider's (ISP) Point Of Presence (POP), an installation that provides a 'gateway' between the telephone network and the Internet via the private network of the ISP, and to subsequently control the connection
  Formatting of data for appropriate transfer over telephone lines using the Point to Point protocol (PPP)
  Basic user authentication mechanisms using standardised, e.g. Password identification Protocol (PAP), Challenge Handshake Authentication Protocol (CHAP), or proprietary algorithms (e.g. Microsoft's™ MS-CHAP, Shiva's™ Password identification Protocol (SPAP), RSA's™ SecurId).
  'System' functions to link the different functions, the data communications protocol stack in the system e.g. Transmission Control Protocol (TCP)/IP and the so-called 'upper-layer' applications.

The second type of software, dial-up managers, builds on the functionality of the first by providing some 'value-added' functions, such as:

Provide statistics and session information to the user such as time spent online, volume of data transferred, status of the communication, network address information, etc.
  Maintaining a list of the telephone numbers for the ISP's POPs world-wide i.e. a phonebook.
  Manage all communications settings for different locations or services and configure. automatically everything depending on the user's selected location and service.
  Enable to export or import communications settings. e.g. to enable an IT manager to distribute settings profiles to corporate end-users.

Mobile Data Technologies

A wide range of fixed and mobile data communications technologies exists. All these technologies have in common that they are always connected but require some complex set-up information. In the following, these characteristics will be termed 'pseudo'-connectionless. These technologies have further in common that they use a specalised access network and use dedicated gateways to access the Internet These technologies will further on be termed Pseudo-Connectionless Technologies (PCT).

One such mobile data communications technology is the so-called GPRS technology. (GPRS) is a telecommunications service which is specially adapted to digital cellular networks such as GSM, Universal Mobile Telecommunications System (UMTS) and Time Division Multiple Access (TDMA), which is the digital mobile services in the US and other markets, that operates in the 800 and 1900 MHz frequency band. GPRS makes use of the packet radio principle and is used to transfer data via e.g. the protocols IP and X.25 from a GPRS terminal to other GPRS terminals or external data networks. GPRS is standardised in European Telecommunication Standardisation Institute (ETSI) (ETSI GSM 09.61, 07.07, 04.60 for GPRS and GSM technologies) and in the third Generation Partnership Project (3GPP), e.g. the 3GPP 23.060 specification. GPRS makes use of a packet data technique to transmit high speed data and low speed data in an efficient way over e.g. GSM radio networks. GPRS optimises the use of network resources and radio resources. A strict separation of the radio subsystems and the network subsystems is obtained which results in that the network subsystems can be reused by other radio access technologies.

GPRS consequently is a packet switched data service which gives a mobile high speed transmission of data with efficient use of the available bandwidth. In theory it can achieve transmission rates up to several 100 kb/s. With a third generation air interface, such as Wideband Code Division Multiple Access (WCDMA) as in the global UMTS standard raw data throughput can go up to 2000 kb/s, as compared with 9,6kb/s which GSM can deliver today. Data transmission via GSM can be realised in two different ways, circuit switched as in voice transmissions of today or packet switched as in GPRS.

However, other fixed or mobile data communications technologies, can fulfil a similar 'bearer' role and share some characteristics with GPRS, such as they are 'pseudo-connectionless', use a specialised dedicated access network and dedicated gateways to access the Internet One example is Cellular Digital Packet Data (CDPD) which refers to the standardised technology "Telecommunications Industry Association (TIA) TR-45.6 (IS-732 and IS-732A) for CDPD" A similar but fixed-line pseudo-connectionless technology is Asymmetric Digital Subscriber Line (ADSL).

Dial-up software requires to be adapted to the pseudo-connectionless characteristics of these technologies and to incorporate configuration parameters and session set-up procedures specific to these technologies.

Current implementations re-use existing software developed for Public Switched Telephone Network (PSTN) dial-lup and use tricks to manage the GPRS connection from a computing device. This will be described later on.

Remote Access Virtual Private Network (VPN) Software.
Secure networking covers three areas:
Authentication: These are techniques that enable to ensure that both ends of the session, the user and the remote network access server, are really who they say they are. This is achieved in a number of ways, but generally requires the user to provide some input, e.g. a password, a smart card etc., and the machines to perform some cryptographic treatment, e.g. hash functions. Password Authentication Protocol (PAP), Challenge Handshake Authentication Protocol (CHAP), Extensible Authentication Protocol (EAP), Message Digest algorithm number 5 (MD-5) and Public Key Infrastructure (PKI) are examples of standard authentication techniques that exists in the market.

Encryption: Using a previously agreed encryption algorithm, machines can scramble the data they exchange so that they can detect any attempt to tamper with it, and ensure end-to-end confidentiality. This however generally requires the two machines to have an identical set of cryptographic material or keys to seed the encryption algorithm. There is a number of encryption algorithms such as Data Encryption Standard DES), 3-DES, Blowfish, Carlisle Adams and Stafford Tavares (CAST), International Data encryption'Standard (IDEA), Rons Code RC-40/128) etc., and a number of key exchange mechanisms such as Internet Key Exchange (IKE), Diffie-Hellman, Rivest Shamir and Aldeman's (RSA) public key encryption algorithm, etc., with various parameters, that users can choose from.

Tunnelling or Virtual Private Networks (VPNs): Lastly, private networks, e.g. corporate, require to be isolated from the public Internet. However, remote mobile users communicate via a public network, in general the Internet Therefore, secure networking requires a protocol that hides the fact that traffic between the private 'islands' goes through the public Internet 'ocean', illustrated in FIG. 1. This is necessary because outgoing traffic from a local computer 100 within a private network 101 to a remotely-connected computer 102 must go through a dedicated security gateway 103, e.g. a VPN router, that applies cryptographic treatment to the data traffic.

Figure 1:
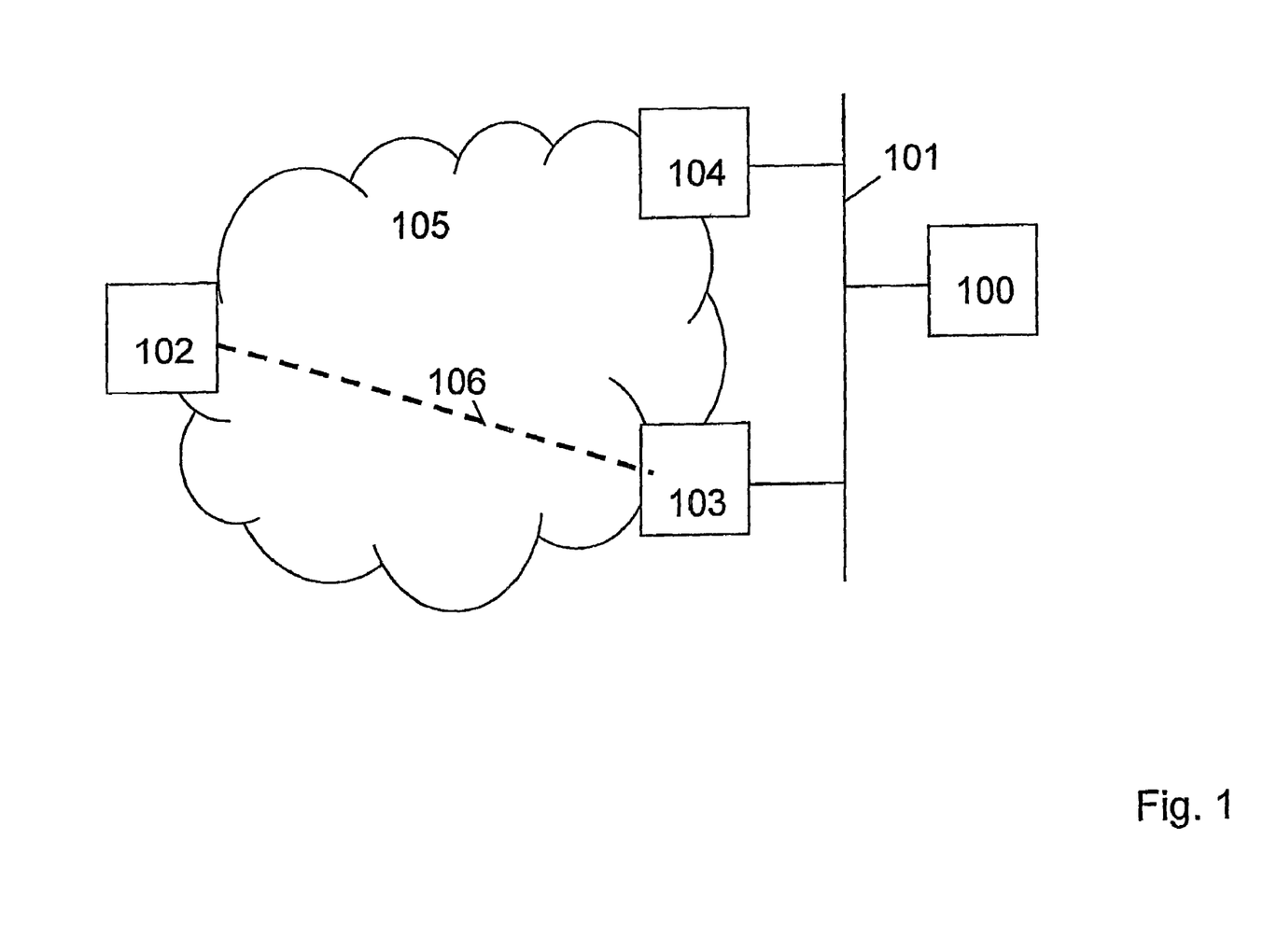
FIG. 1 shows a block diagram of a communications system according prior art

To achieve this, a so-called 'tunneling protocol' is required. This protocol gives the illusion that a remote computer 102 is directly connected to the private network 101. It avoids local machines sending data in clear via an un-secure public gateway 104 when they reply to a remote computer. Instead data to the remote computer is intercepted by the secure gateway 103, e.g. using proxy Address Resolution Protocol (ARP), optionally encrypted, then 'encapsulated', and finally routed via the Internet 105 to the remote computer 102. This secured private data traffic is indicated in FIG. 1 with a broken line 106.

Again, there is a range of protocols that users can choose from, each with their own particularities and requiring specific configuration data. Internet Engineering Task Force (IETF) standards such as Secure IP (IPSec), Layer 2 Tunneling Protocol (L2TP), General Routing Encapsulation (GRE), etc. are examples of such protocols.

Commercial secure VPN client software generally comprises two components:
A kernel-mode driver that is installed in the machine's operating system and intercepts all network traffic and performs the appropriate transforms such as packet header formatting, checksums, sequence numbering, encryption etc.
A user-mode configuration tool that enables to set the parameters for the particular VPN protocol driver and set the security policy, e.g. which traffic should be secured, in what conditions, using which techniques, etc.

Typical Usage Scenario with Current Techniques

In the very near future, when commercial GPRS and similar services are introduced, a mobile workforce of a corporation that requires to access its corporate network while on the move will face two challenges:
Perform the installation and configuration of the appropriate software and communication parameters, and
launch several applications and perform several login procedures every time they want to access their remote corporate network Below is an overview of the required installation and configuration steps with current techniques:

1. Install and configure a modem in the PC, maybe using some additional drivers and/or scripts provided by the GPRS handset manufacturer.
2. Define one or several Packet Data Protocol (PDP) context This can be achieved in several ways such as:
   Static configuration by handset factory settings.
   Defined by GPRS operator at service provisioning time by Subscriber Identity Module (SIM) activation, or over-the-air activation.
   Direct manual keying of the PDP context data in the handset by using menus.
   Through the PC by entering GPRS-specific standard initialisation commands like 'AT+CGDCONT=0,IP,internet.gprs.telia.se,0,1' (PDP context definition) in the parameters of the modem or using a HyperTerminal™ session and communicating the parameters to the handset through the PC's serial port.
   This PDP definition step could also be performed at session setup time (see next sub-section).
3. Configure a username and password in the handset. This is optional and again this may be achieved in several ways:
   Manual keying-in of these authentication credentials
   Factory setting by the GPRS handset manufacturer.
   Set by the GPRS operator during the service provisioning procedure, e.g. SIM card activation, over-the-air activation.

4. Create and configure a dial-up networking connection with a GPRS 'service string' in the form of '*98**#' in place of the phone number. This is a so-called 'modem compatibility' trick to be able to use existing dial-up software.
5. Install the VPN software, e.g. from a Compact Disk (CD), and then configure the appropriate addressing and authentication options, which may imply installing and configuring additional software, e.g. RSA's SecurID, importing a digital certificate.

When a user wants to access a network, e.g. his/her corporate network, using the GPRS service, the procedure below is currently followed:
1. Physically link the PC and the handset, e.g. by using a serial cable, or by activating the infrared link on the handset.
2. Optionally, launch a GPRS-specific software or script to perform step 2 above (PDP context definition) and select the PDP context to be activated.
3. Launch the dial-up software. This activates the PDP context.
4. Enter a username and password if prompted. These are the ones that were set in step 3 above.
5. Wait for connection set-up, then launch the VPN software.
6. Enter authentication credentials if prompted, e.g. username/password, smartcard/Personal Identification Number (PIN) code.

As can be seen in the 'Typical Usage Scenario' above, installation and session set-up can be fairly complex and constitute a barrier to the initial take-up by corporate users and further mass-usage of GPRS services.

Notably, the configuration requires a lot of manual keying-in of information in the handset and manual software configuration in numerous places of the operating system and dial-up/VPN software. This requites an in-depth technical knowledge that most end users will not have.

Also, the session set-up procedure requires the user to launch different applications and multiple username/password entries, as well as optionally running a script of some sort to configure the specific GPRS session parameters (PDP context data). This is time consuming and requires an in-depth technical knowledge that most end users will not have.

Moreover, the current way of configuring and setting up such GPRS remote access is not flexible and does not enable to take advantage of future capabilities of e.g. GPRS terminals such as multiple PDP context support roaming using a 'visited' Access Point Name (APN), alternative ISP support and quality of service options.

Mainly, this is due to the fact that the PDP context data is either configured in the handset or using modem init commands. Because of this, depending on PC operating system and GPRS handset capabilities, only one set of PDP context information can be stored, or supporting several ones is cumbersome.

To summarise, drawbacks with the current remote access to a private data communications network, via a PCT device, are that the management of PCT session parameters (e.g. GPRS PDP context) lacks flexibility.

SUMMARY OF THE INVENTION

The object of the invention is to overcome the above mentioned drawbacks and provide a way of remote and secure access to a private data communications network, via a PCT device, that is further facilitated for the user.

This is achieved according to the method and arrangement set forth in the characterising parts of the independent claims.

Thanks to the provision of the Remote Access Login system, the information and instructions, needed for secure networking session configuration and set-up, are brought together in a single interface, and thanks to the provision of the remote access login method, a single connect activity by a user will perform the remote and secure access.

Preferred embodiments are set forth in the dependent claims.

An advantage of the present invention is that the procedures for session set-up are shorter and require less user intervention.

Another advantage of the present invention is that the configuration becomes easier.

A further advantage of the present invention is that the flexible PDP context management enable usage scenarios that are not straightforwardly possible using current software, such as obtaining GPRS services when roaming using a so-called "visited APN", easily changing Quality of service parameters e.g. when using different handsets, accessing another Internet Service Provider service than the one provided by default in the handset.

DESCRIPTION OF PREFERRED EMBODIMENTS

The present invention can be described in short as a dial-up remote access 'dialler' integrated with a secure VPN client and with features for the support of so-called Pseudo-Connectionless Technology (PCT) devices and services such as GPRS devices and services, as well as an enhanced user interface for greater usability. The invention, comprising software logic and software components, is implemented in a computer, e.g., a Personal Computer (PC)—a desktop or a laptop, a Personal Digital Assistant (PDA) or any industrial or consumer electronic device with communications or interfacing capabilities, and is from now on called the Remote Access Login (RAL) system.

Figure 2:
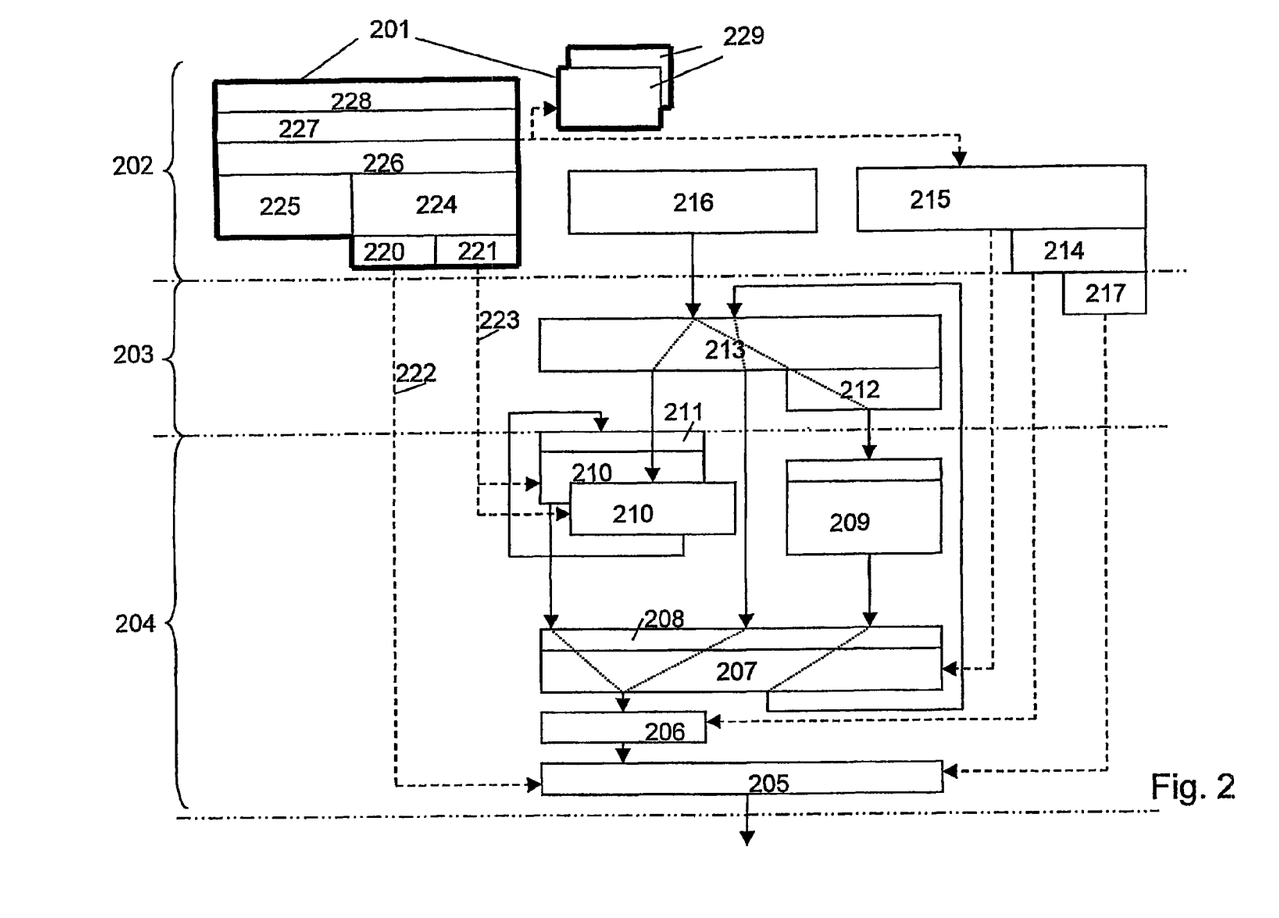
FIG. 2 shows a block diagram of involved software components according to the invention.

FIG. 2 illustrates an overview of the software components involved in a secure GPRS remote access client according to the present invention. The RAL software components according to the present invention is represented by 201 and the rest of the software components in FIG. 2 are prior art. Dashed lines represent configuration data flow, thick solid lines represent the path taken by 'user' datagrams from upper layer applications through the kernel components towards the GPRS handset Microsoft's Windows™ operating system is used as an example, but the present invention is also applicable together with other operating systems such as Mac™ OS, Palm™ OS, EPOC™, etc.

The vertical areas in the figure represent the user mode 202, the kernel mode transport drivers 203 and the kernel mode Network Driver Interface Specification (NDIS) drivers 204 and are separated by horizontal dash-dotted lines.

The software components involved are, starting from the lower layer, the kernel mode NDIS drivers 204 are the Asynchronous/Serial Port Drivers 205, the Network Driver (ND) Proxy 206, the so-called dial-up adapter, PPP NDIS Wide Area Network (WAN) 207, the virtual 802.3 adapter (using the Ethernet (IEEE 802.3 specification)) 208, the Point to Point Tunnelling Protocol/Layer 2 Tunnelling Protocol (PPTP/L2TP) component 209 with a virtual adapter 218, and two instances of a 3rd Party IPSec driver 210 and its virtual adapter 211. This 3rd Party IPSec is an NDIS driver provided by an independent software vendor. The virtual adapter 211, fulfils a similar role as the previously mentioned 802.3 virtal adapter 208. When functioning in the so-called 'tunnel mode' the second instance of the 3rd-party IPSec driver must resemble a Network Interface Card (NIC) from the point of view of the first instance of the 3rd-party IPSec driver.

Involved software components in the kernel mode transport drivers 203, are the Microsoft™ IPSec 212 and the Transmission Control Protocol/Internet Protocol (TCP/IP) protocol driver 213 and the UNImodem 217.

Involved software components in the user mode 202 are the Telecommunication Application Programming Interface (TAPI) 214, the Remote Access Service (RAS) 215 and the upper layer application 216, e.g. a web browser.

The user mode 202 further comprises the RAL system 201, i.e. the software components according to the present invention, which now will be described more in detail.

Starting from the lower layers, these user mode 202 components mainly include:

Application Programming Interface (API) to GPRS 220 and API to VPN 221 devices. In order to support devices that are non-standard for the operating system, the RAL system comprises components APIs that enable to abstract a generic behaviour of these devices for the other, upper, software components. This generic behaviour is embodied by a standard set of commands for each of the GPRS device and the VPN device that will be sent by the upper layer components and translated into device- or system-specific signals indicated with arrows 222 and 223 to the appropriate underlying kernel devices.

If required, a set of RAS functions 224 for VPNs and GPRS, because of possible limitations of the operating system. These components enable to perform specific session set-up procedures that are not covered by existing software, e.g. specific GPRS functions such as PDP context definition.

A user Profiles Database 225. The RAL system 201 maintains a database containing all the data relevant to the end-to-end chain of configuration data that is required by the different software components outside the RAL system 201, to set-up a secure mobile data connection. It notably enables to flexibly manage PDP context data. Where appropriate, the data will be passed to components outside of the RAL system, e.g. to the RAS for the dial-up parameters such as phone numbers etc.

Genetic APIs are in two forms:
Platform APIs 226 which provide support for multiple Operational System platforms, e.g. Windows™, Palm™, EPOC™, Mac™ etc., and are only relevant in the context of software code implementation.
Plugin APIs which are a set of public commands and parameters that the RAL understands or generates for the support of standalone plugins 229.

The processing core 227 is the controlling part of the RAL system 201. It translates user input, such as text, numbers, mouse clicks, etc., taken from the Graphical User Interface (GUI) 228, into signals to the appropriate underlying components and co-ordinates and triggers the different procedures according to the appropriate logic, e.g. define a PCT session PDP context, passing the session context to the PCT device, trigger the set-up of a dial-up connection, then set-up the VPN connection.

The GUI 228 of the RAL system brings together in the same application all the necessary interfaces for the configuration and set-up of a networking session over pseudo-connectionless bearers, e.g. GPRS, or standard dial-up bearers, e.g. PSTN, Integrated Services Digital Network (ISDN).

An example of a GUI of the RAL system comprises a genetic control window, enabling session management and giving access to 'session profiles' for the three layers involved in mobile secure networking, VPN, GPRS (PDP), mobile device (modem dial-up). An expanded bottom frame comprises the particular configuration settings of the selected profile. An information element enables to link the three layers together, thus enabling to automate the set-up for a particular end-to-end session.

As an add-on to main RAL system 201, several standalone plugin modules 229 can communicate with the RAL 201 via a generic API part of 226 to perform value-added functions that make use of special characteristics or functions of the PCT connection or PCT device. In the case of GPRS, such a plugin module 229 could for instance be a meter that records the volume of data transferred and translates it into the amount of money that the user will have to pay the GPRS operator (the latter charges usage per unit of data volume transferred), the amount of money is then displayed in real-time towards the user, via a GUI implemented in the plugin software code 229 independent of the main RAL system 201. The principles of such plugins is that they are completely autonomous and rely only on the API 226.

Figure 3:
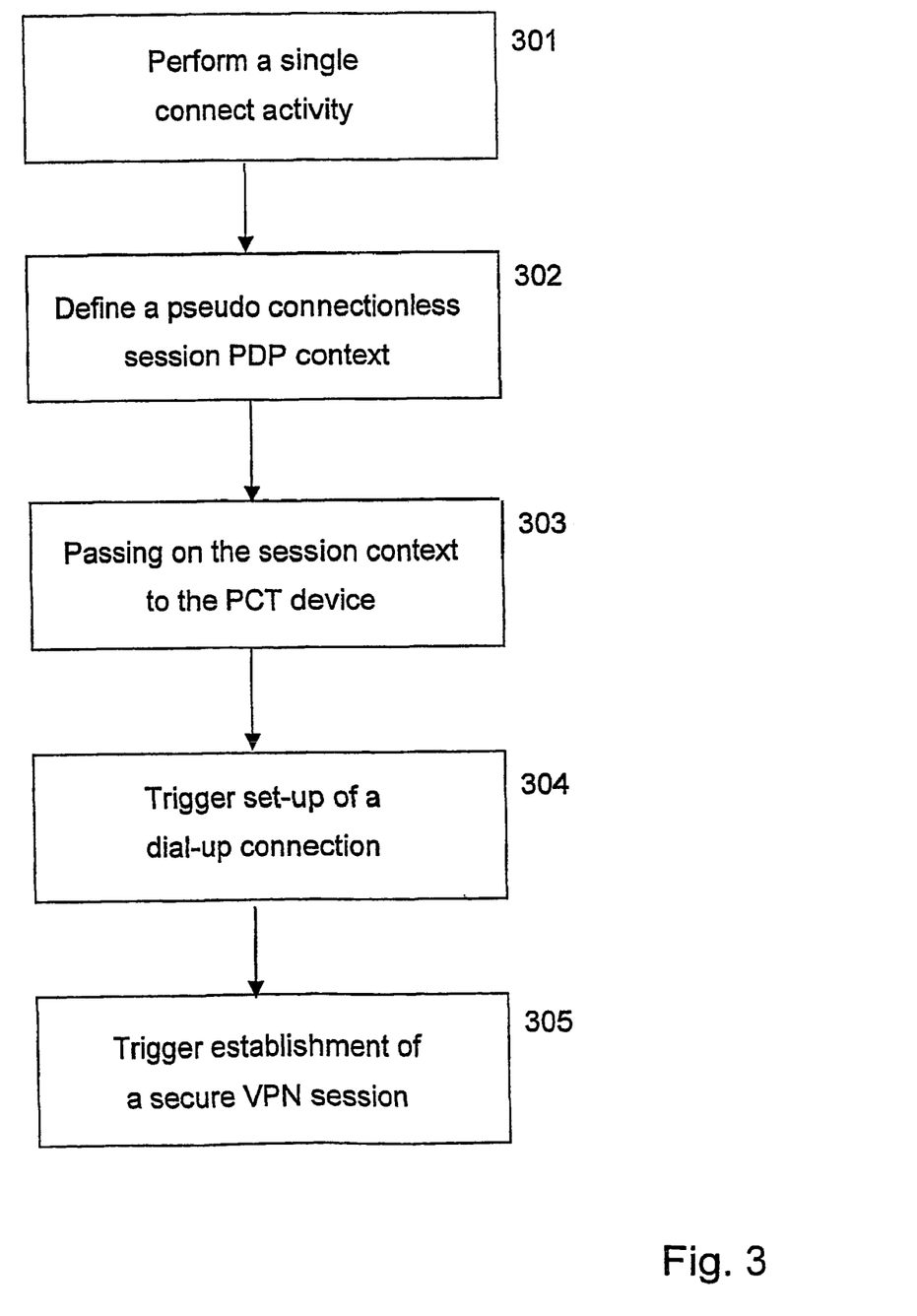
FIG. 3 shows a flowchart of the method according to the invention.

FIG. 3 shows a flowchart of the set-up of a remote and secure access session from a computer, comprising the software logic and software components of the RAL system, to a private data communications network, via a so-called Pseudo-Connectionless Technology (PCT) device, e.g. General Packet Radio Service (GPRS) device.

The method includes the following steps:
301. A user of the computer performs one single connect activity, e.g. a mouse click, which automatically triggers the RAL system to perform the following steps:
302. Defining a PCT session Packet Data Protocol (PDP) context, comprising pseudo-connectionless characteristics of a PCT session.
303. Passing the defined session context to the PCT device.
304. Triggering the set-up of a dial-up connection, and
305. Triggering the establishment of a secure Virtual Private Network (VPN) session.

The method is implemented by means of a computer program product comprising the software code portions for performing the steps of the method. The computer program product is run on the computer.

The computer program is loaded directly or from a computer usable medium, such as floppy-disc, CD, Internet etc.

The Required Installation and Configuration of the RAL System.

In these examples the PCT used is GPRS.
A modem shall be installed and configured in a computer, maybe using some additional drivers and/or scripts provided by the GPRS handset manufacturer (as described above in the 'description of related art' part).

The user installs the RAL system software in the computer.

The user configures pseudo-connectionless session profiles, with all the Information Elements (IEs) necessary for the set-up of the end-to-end secure mobile networking session. The RAL provides a single window to access all the relevant IEs. Two possible methods are:
1. The user creates a profile and fills it in using information provided by the GPRS operator or corporate IT department.
2. The user performs a single-click configuration by importing a configuration file distributed by the GPRS operator or a corporate IT department.

Optionally, configure authentication credentials in the handset if these cannot be configured using the RAL system because of GPRS handset limitations.

The Session Set-up According to the RAL System.

When a user of a computer wants to access their corporate network via the GPRS service using the RAL system the procedure below will be followed:

The user physically links the Computer and the handset, either using a serial cable, or by activating the infrared link on the handset, as described under description of related art, above.

The user launches the software for the RAL system, optionally, the RAL system can be automatically launched when staring the computer, and clicks with a cursor on an connect icon within the GUI, or equivalent GUI widget, e.g. press the enter button on a keypad that acts on the computer.

Future technologies may enable other interface metaphors, e.g. voice command, eye movement, etc.

Figure 4:
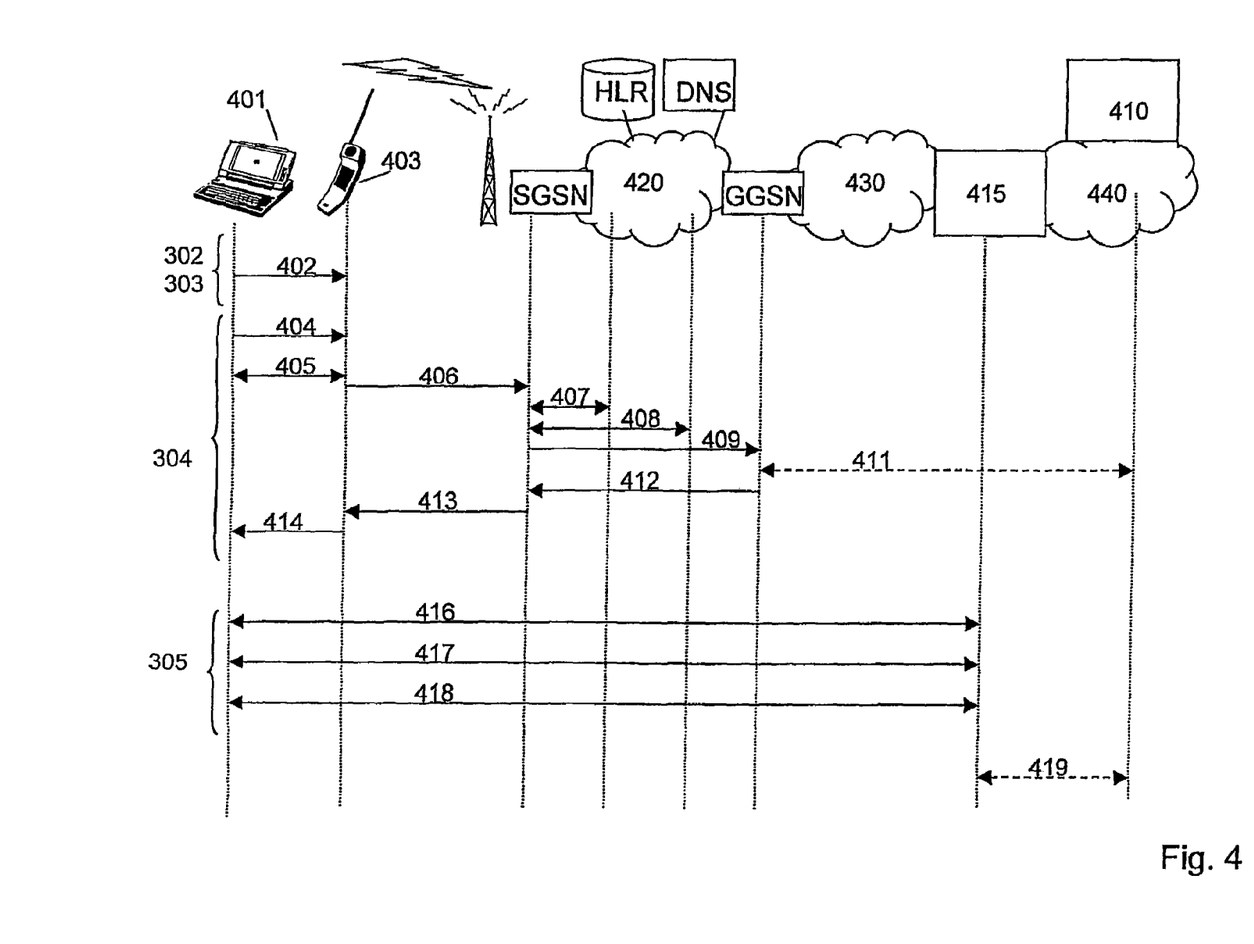
FIG. 4 shows signalling sequences according to the invention.

The diagram in FIG. 4 outlines what happens in the network after the user clicks 'connect'. The involved networks are the GPRS Public Land Mobile Network (PLMN) backbone 420, the Public Internet 430 and the Private IP Network 440. The process can be divided in the four main parts:

302. Defining a GPRS session Packet Data Protocol (PDP) context, comprising pseudo-connectionless characteristics of a GPRS session.
303. Passing the defined session context to the GPRS device.
304. Triggering setting-up of a dial-up connection by activating PDP context, and
305. Triggering establishing of a secure Virtual Private Network (VPN) session After the user clicked 'connect', the RAL system software, comprised in the computer 401 will first pass on a message 402 to the GPRS device 403, the message 402 comprising the GPRS session parameters that were configured when the session profile was created. These parameters define the pseudo-connectionless characteristics of the GPRS session, and form the so-called 'PDP context'.

These parameters are e.g. PDP Type, Access Point Name (APN), compression options, IP address and quality of service options. All these parameters are optional in a PDP context definition message. Where they are not explicitly set, they can be set later by either the computer 401 during the PPP negotiation phase 405, provided by the GPRS network at the Home Location Register (HLR) query step 407, or by default setting in the handset 403.

With current GPRS terminals the message 402 is passed using a standard AT command, sent to the terminal via a PC peripheral interface such as e.g.
a serial port,
a parallel port,
a Personal Computer memory Card International Association (PCMCIA) interface,
a computing bus, e.g. Micro Channel Architecture (MCA), Industry Standard Architecture (ISA), Enhanced ISA (EISA), Video Electronics Standards Association local bus (VESA), Peripheral Component Interconnect (PCI), mini-PCI, Small computer System Interface (SCSI), Fibre Channel, Serial Bus Protocol with IEEE 1394 Firewire physical layer,
a Universal Serial Bus (USB) port,
an Infrared Data Association (IrDA) interface,
Bluetooth short-range radio interface.

Then, the software logic of the RAL system 401 calls the dial-up capabilities of the Operating System it resides on. For Windows™ 98, NT or 2000, this makes use of functions provided by the Remote Access Service (RAS) component. Alternatively, the said operating system can be any of the ones in existence, such as Palm™, EPOC™, Mac™, Linux™, unix™; in which case the said dial-up capabilities make use of functions provided by OS functions equivalent to the RAS or functions provided by independent $3^{rd}$-party software.

The parameters that are passed to the RAS are dial-up parameters, e.g. authentication protocol address allocation policy, compression etc. and authentication credentials which are used optionally for the GPRS non-transparent access case.

In Windows™, the software logic of the RAL system writes the dial-up parameters in a system file, a so called phonebook, that is then read by the RAS when it performs the dial-up connection procedure. The software logic of the RAL system also indicates the RAS in which file to read when it Triggers the RAS dial-up. This file also contains, hard coded, the service string, i.e. phone number, for GPRS, e.g. *98**1#.

The authentication credentials are put in an 'opaque' memory (Random Access Memory (RAM) location by the software logic of the RAL system, where they will later be retrieved by the RAS using standard Operating System (OS) functions. A pointer to this location is passed to the RAS.

Once the RAS is launched, it performs the following operations without the involvement of the software logic of the RAL system:

Send a 'Dial' command 404 to the GPRS device 403 with the GPRS 'service string'. Enter the so-called 'PPP negotiation phase' 405, (terminated by 414) which itself comprises three consecutive steps:
1. PPP Link Control Protocol (LCP): the computer 401 and the GPRS device 403 exchange several messages to negotiate link parameters e.g. Maximum Receive Unit MRU), Authentication Protocol.
2. PPP Authentication: Optionally, the RAS component 215 in the computer 401 retrieves the authentication credentials from RAM and passes them on to the GPRS phone 403.
3. PPP Network Control Protocol (NCP)/IP Control Protocol (IPCP): the RAS requests certain IP network parameters (as per the requirements passed by the RAL system) in a 'PPP IPCP configuration request' message. These parameters comprise e.g. IP address allocation policy, name servers, end-to-end compression, etc.

This third step in turn triggers the GPRS handset 403 to initiate 406 a PDP context activation procedure with the Serving GPRS Support Node (SGSN) in the GPRS network. This 'Activate PDP Context Request' message 406 contains the APN and optionally the authentication credentials.

The PPP IPCP configuration phase will terminate when the GPRS network acknowledges the end of the PDP context activation procedure 413. The handset will then return to the computer 401 a 'PPP IPCP configuration acknowledgement' 414, which notifies the RAS of the end of the session set-up. The control focus then returns to the RAL system.

Depending on the service scenario, the PDP context activation procedure inside the GPRS network will be more or less complex.

Several combinations of cases are possible here, e.g. Transparent or Non-Transparent case and Roaming or non-roaming case.

The behaviour of the network is determined by the APN that is passed on to the Serving GPRS Support Node (SGSN) and Gateway GPRS Support Node (GGSN) at PDP context activation time. This is independent of the RAL system. Based on the APN, it is the SGSN that determines the behaviour with respect to roaming, the SGSN then establishes a GPRS Tunnelling Protocol (GTP) tunnel and passes on the APN to the GGSN which determines the behaviour with respect to access transparency.

For instance, in the most complicated case which is the non-transparent roaming access:

The SGSN will query 407 the HLR to check the PDP context activation parameters with the subscriber records, thus enabling to prevent fraudulent usage and to fill in the optional parameters that may have not been defined previously.

The SGSN will query 408 the Domain Name Service (DNS) for the APN.

The DNS returns an IP address for the GGSN to use, i.e. the home GGSN or a GGSN on the visited network depending on the operator's roaming policy implemented in the DNS.

The SGSN sends a 'Create PDP Context Request' message 409 containing the APN and the authentication credentials to the GGSN.

Based on the APN, the GGSN determines that it has to perform a non-transparent access procedure. Therefore it contacts a server 410 on the private corporate network (e.g. Remote Authentication Dial-In User Service RADIUS) and/or Dynamic Host Configuration Protocol (DHCP) to get an IP address that it allocates to the Mobile Station that activated the PDP context in the first place 411.

The GGSN returns a 'create PDP context accept' message 412 containing the IP address it allocated to the GPRS handset 403 and the computer 401.

The SGSN passes on this message to the GPRS handset 403 in an 'Activate PDP context response' message 413.

The GPRS handset 403 generates a PPP IPCP configuration acknowledgement message 414 that it passes on to the RAS in the computer via e.g. the serial or infrared link This message 414 comprises the IP settings.

Once the RAS receives this PPP IPCP configuration acknowledgement message 414, it configures the computer 401's. Operating System's TCP/IP stack correctly and binds it with the low level NDIS drivers for dial-up NDISWAN—see FIG. 2.

The RAS then generates a response towards the RAL system software to acknowledge that the GPRS connection was successfully set-up.

In cases where VPN components shall be used, as indicated in the user-defined profile, the RAL system then triggers the next step, the necessary procedures to establish a secure VPN session.

For instance, based on the user configuration parameters it stores, the RAL system selects a VPN device e.g. Microsoft™ IPSec 212 in FIG. 2, and Microsoft™ L2TP 209, or a $3^{rd}$-party IPSec driver 210, and passes on, either via the RAS 215 or directly 223, the additional parameters required such as VPN gateway name or IP address, authentication protocol, pointer to authentication credentials, e.g. digital certificates or username/password, which may have been defined using the RAL system.

The VPN software will then perform the necessary steps to establish the secure connection by negotiating bulk encryption keys with the VPN gateway 415, by using IPSec's Internet Key Exchange (IKE) protocol 416, then establish the VPN tunnel, e.g. L2TP 417 and authenticate the user 418, which may involve optionally a RADIUS/Authentication, Authorisation, Accounting (AAA) query 419.

The invention is not limited to the above described embodiments. Various alternatives, modifications and equivalents may be used. Therefore, the above embodiments should not be taken as limiting the scope of invention, which is defined by the appendant claims.

| | Acronyms |
|---|---|
| 3GPP | Third Generation Partnership Projec |
| AAA | Authentication, Authorisation, Accounting, by extension the suite of IETF protocols to perform these functions. |
| ADSL | Asymmetric Digital Subscriber Line |
| API | Application Programming Interface |
| APN | Access Point Name |
| ARP | Address Resolution Protocol |
| CAST | Carlisle Adams and Stafford Tavares |
| CD | Compact Disk |
| CDPD | Cellular Digital Packet Data |
| CHAP | Challenge Handshake Authentication Protocol |
| DECT | Digital Enhanced Cordless Telephone |
| DES | Data Encryption Standard |
| DHCP | Dynatnic Host Configuration Protocol |
| DNS | Domain Name Service |
| EAP | Extensible Authentication Protocol |
| EISA | Enhanced ISA |
| ETSI | European Telecommunications Standards Institute |
| GGSN | Gateway GPRS Support Node |
| GPRS | General Packet Radio Service |

-continued

| Acronyms | |
|---|---|
| GRE | Generic Routing Encapsulation |
| GSM | Global System for Mobile communications |
| GTP | GPRS Tunnelling Protocol |
| GUI | Graphical User Interface |
| HLR | Home Location Register |
| IDEA | International Data Encryption Algorithm |
| IE | Information Element |
| IETF | Internet Engineering Task Force |
| IKE | Internet Key Exchange |
| IP | Internet Protocol |
| IPSec | Secure IP (IETF) |
| IPCP | IP Control Protocol |
| IrDA | Infrared Data Association |
| ISA | Industry Standard Architecture |
| ISDN | Integrated Services Digital Network |
| ISP | Internet Service Provider |
| L2TP | Layer 2 Tunnelling Protocol (IETF) |
| LCP | Link Control Protocol |
| MCA | Micro Channel Architecture |
| MD-5 | Message Digest algorithm number 5 |
| MRU | Maximum Receive Unit |
| MS-CHAP | Microsoft CHAP |
| MSC | Mobile Switching Centre |
| NCP | Network Control Protocol |
| ND | Network Driver |
| NDIS | Network Driver Interface Specification |
| NIC | Network Interface Card |
| OS | Operating System |
| PAP | Password Authentication Protocol |
| PC | Personal Computer |
| PCI | Peripheral Component Interconnect |
| PCMCIA | Personal Computer Memory Card International Association |
| PCS | Personal Communications System |
| PCT | Pseudo Connectionless Technology |
| PDA | Personal Digital Assistant |
| PDP | Packet Data Protocol |
| PIN | Personal Identification Number |
| PKI | Public Key Infrastructure |
| PLMN | Public Land Mobile Network |
| POP | Point Of Presence |
| PPP | Point to Point Protocol |
| PPTP | Point to Point Tunnelling Protocol (Microsoft) |
| PSTN | Public Switched Telephone Network |
| QoS | Quality of Service |
| RADIUS | Remote Authentication Dial-In User Service |
| RAL | Remote Access Login |
| RAM | Random Access Memory |
| RAS | Remote Access Server |
| RC | Ron's Code |
| RC-40/128 | RC with 40 bits or 128 bits key |
| RSA | Rivest Shamir and Aldeman's public key encryption algorithm or eponymous company specializing in security software. |
| SCSI | Small Computer System Interface |
| SGSN | Serving GPRS Support Node |
| SIM | Subscriber Identity Module |
| SPAP | Shiva's Password Authentication Protocol |
| TCP | Transmission Control Protocol |
| TIA | Telecommunications Industry Associations |
| UI | User Interface |
| UMTS | Universal Mobile Telecommunications System |
| USB | Universal Serial Bus |
| VESA | Video Electronics Standards Association local bus |
| VPN | Virtual Private Network |
| WAN | Wide Area Network |
| WCDMA | Wideband Code Division Multiple Access |

The invention claimed is:

1. A method for setting-up a remote and secure access session from a computer (401) to a data communications network (440), via a so-called Pseudo-Connectionless Technology (PCT) device (403), e.g. General Packet Radio Service (GPRS) device, the computer comprising a Remote Access Login (RAL) system, the method comprises the following steps:

a user of the computer (401) performing (301) one single connect activity, which automatically triggers the RAL system within the computer (401) to perform the following steps:

defining (302) a PCT Packet Data Protocol (PDP) session context, comprising pseudo-connectionless characteristics of a PCT session and passing (303) said session context on to the PCT device (403) in a message;

triggering (304) setting-up of a dial-up connection;

when required, triggering (305) establishing of a secure Virtual Private Network (VPN) session between the computer (401) and a VPN gateway within the data communications network (440).

2. The method according to claim 1, wherein the RAL system comprises a Graphical User Interface (GUI), said single connect activity is performed by a cursor clicking on an icon of said GUI or pressing the enter button on a keypad acting on said computer.

3. The method according to the claim 2, comprising the further step to be taken before the step of performing (301) the single connect activity:

configuring PCT session profiles by accessing, in a single window in said GUI, all the necessary Information Elements (IE) required for setting-up an end-to-end secure networking session.

4. The method according to claim 1, wherein the PCT device constitutes a GPRS device, wherein the step of passing (303) said session context on to the PCT device (403) in a message is performed by using a standard AT command.

5. The method according to claim 1, wherein the step of triggering (304) setting-up of a dial-up connection comprises the step of:

calling the dial-up capabilities of the operating system the RAL system resides on.

6. The method according to claim 5, wherein said operating system is Windows™ 98, NT or 2000, said dial-up capabilities making use of functions provided by the Remote Access Service (RAS).

7. The method according to claim 5, wherein the step of triggering (304) setting-up of a dial-up connection comprises the further step taken by the RAL system:

storing dial-up parameters in a system-file.

8. The method according to claim 7, wherein the step of triggering (304) setting-up of a dial-up connection comprises the further step taken by the RAL system:

indicating to the RAS in which file said stored dial-up parameters are readable.

9. The method according to claim 8, wherein the step of triggering (304) setting-up of a dial-up connection comprises the further step taken by RAS:

reading said dial-up parameters in said system file when performing a dial-up connection procedure.

10. The method according to claim 1, wherein the step of triggering (304) setting-up of a dial-up connection comprises the further step taken by the RAL system:

storing authentication information in a RAM memory location.

11. The method according to claim 10, wherein the step of triggering (304) setting-up of a dial-up connection comprises the further step taken by the RAL system:

passing to the RAS, a pointer, where to retrieve said stored authentication credentials.

12. The method according to claim 1, wherein the step of triggering (305) the establishment of a secure VPN session comprises the further step to be taken by the RAL system:

selecting a VPN device based on user configuration parameters stored in the RAL system.

13. The method according to claim 12, wherein the step of triggering (305) the establishment of a secure VPN session comprises the further step to be taken by RAL system:

passing on, to the VPN device, additional parameters required for establishing said secure VPN session.

14. The method according to claim 1, wherein the step of triggering (305) the establishment of a secure VPN session is optional.

15. The method according to claim 1, wherein the RAL system comprises at least one separate stand alone plugin module (229), the method comprising the further step to be taken by said module:

performing value add functions by using the PCT connection.

16. The method according to claim 15, wherein said plugin module (229) constitutes a meter, the method comprising the further step of:

recording the volume of data transferred; and translating it into the cost that the PCT operator will charge the user.

17. The method according to claim 16, comprising the further step of:

displaying said cost in real-time towards the user via a GUI.

18. A computer program product directly loadable into the internal memory of a digital computer, comprising the software code portions for performing the method according to any of the claim 1, when said product is run on a computer.

19. A computer program product stored on a computer usable medium, comprising readable program for causing a computer, to control an execution of the method according to claim 1.

20. A Remote Access Login (RAL) system (201) acting in a computer for setting-up a remote and secure access session from the computer to a data communications network via a so-called Pseudo-Connection-less Technology (PCT) device, e.g. General Packet Radio Service (GPRS), said computer comprising communication capabilities, characterized in that the RAL system comprises:

a Graphical User Interface (GUI) (228) comprising means for a user to perform a single connect activity;

a processing core (227) that translates user input taken from the GUI into signals to appropriate underlying components, the processing core (227) also co-ordinates the procedures for defining a PCT session Packet Data Protocol (PDP) context, passing the session context on to the PCT device, setting up a dial-up connection and when required establishing a secure Virtual Private Network (VPN) session between the computer (401) and a VPN gateway within the data communications network (440).

21. The RAL system (201) according to claim 20, characterized in that said single connect activity is performed by a click by the cursor on an icon of said GUI or by press the enter button on a keypad acting on said computer.

22. The RAL system (201) according to claim 21, characterized in that said GUI comprises a single window to access all the Information Elements (IEs) that are necessary for configure PCT profiles.

23. The RAL system (201) according to claim 20, characterized in that it comprises an Application Programming Interface (API) to PCT (220), that enables to abstract a genetic behaviour of PCT devices, that are non-standard for an operation system, for upper software components.

24. The RAL system (201) according to claim 20, characterized in that it comprises an API to VPN (221), that enables to abstract a generic behaviour of VPN devices, that are non-standard for an operation system, for upper software components.

25. The RAL system (201) according to claim 20, characterized in that it comprises a set of Remote Access Server (RAS) functions (224) that enables to perform specific session set-up procedures.

26. The RAL system (201) according to claim 20, characterized in that it comprises a user profiles database (225) for storing all the data relevant to the end-to-end chain of configuration data that is required by the different software components outside the RAL system to set-up a secure data connection to a private data communications network.

27. The RAL system (201) according to claim 20, characterized in that it comprises at least one generic API (226) for providing support for at least one operational system platform.

28. The RAL system (201) according to claim 27, characterized in that it comprises at least one separate stand alone plugin module (229) that performs value add functions using the PCT connection.

29. The RAL system (201) according to the claim 28, characterized in that said plugin module (229) has means for communicating with said at least one generic API (226) for performing said value add functions.

30. The RAL system (201) according to claim 29, characterized in that said plugin module (229) constitutes a meter that records the volume of data transferred and trans lates it into the cost that the PCT operator will charge the user.

31. The RAL system (201) according to the claim 30, characterized in that said cost is displayed in real-time towards the user via a GUI.

32. A method for configuring PCT session profiles in a Remote Access Login (RAL) system (201) according to claim 20, wherein
the method is characterized by the steps of:
accessing, in a single window in said GUI, all the necessary Information Elements (IE) required for setting-up an end-to-end secure networking session
performing a single-activity configuration by importing a configuration file distributed by a GPRS operator or a corporate IT department.

33. A computer program product directly loadable into the internal memory of a digital computer, comprising the software code portions for performing the method according to claim 32, when said product is run on a computer.

34. A computer program product stored on a computer usable medium, comprising readable program for causing a computer, to control an execution of the method according to claim 32.

* * * * *